United States Patent [19]
Chino

[11] Patent Number: 6,131,918
[45] Date of Patent: Oct. 17, 2000

[54] AXLE TILT CONTROL APPARATUS FOR INDUSTRIAL VEHICLES

[75] Inventor: Kenji Chino, Kariya, Japan

[73] Assignee: Kabushiki Kaisha Toyoda Jidoshokki Seisakusho, Kariya, Japan

[21] Appl. No.: 09/111,323

[22] Filed: Jul. 7, 1998

[30] Foreign Application Priority Data

Jul. 8, 1997 [JP] Japan ..................................... 9-182505

[51] Int. Cl.⁷ .............................. B60G 9/02; B60G 17/00
[52] U.S. Cl. ........................ 280/6.154; 280/754; 280/755; 280/6.15; 280/124.112; 280/5.502; 280/DIG. 1
[58] Field of Search ..................................... 280/755, 754, 280/6.15, 124.11, 124.16, 124.112, 124.111, DIG. 1, 6.154, 5.502, 5.501, 5.507, 5.508

[56] References Cited

U.S. PATENT DOCUMENTS

| | | | |
|---|---|---|---|
| 4,205,864 | 6/1980 | Hoefer | 280/714 |
| 4,512,589 | 4/1985 | Ambrose et al. | 280/6 R |
| 4,705,295 | 11/1987 | Fought | 280/754 |
| 4,973,079 | 11/1990 | Tsukamoto | 280/5.501 |
| 5,044,661 | 9/1991 | Kawabata | 280/5.501 |
| 5,085,460 | 2/1992 | Takahashi | 280/DIG. 1 |
| 5,271,632 | 12/1993 | Glaser et al. | 280/6.12 |
| 5,639,119 | 6/1997 | Plate et al. | 280/124.112 X |
| 5,785,344 | 7/1998 | Vandewal et al. | 280/714 |
| 5,813,697 | 9/1998 | Bargenquast et al. | 280/754 |

FOREIGN PATENT DOCUMENTS

| | | |
|---|---|---|
| 0 543 321 A1 | 5/1993 | European Pat. Off. . |
| 0 662 446 A1 | 7/1995 | European Pat. Off. . |
| 3923266 | 1/1990 | Germany . |
| 56-25609 | 3/1981 | Japan . |
| 58-167214 | 10/1983 | Japan . |
| 58-183307 | 10/1983 | Japan . |
| WO 85/01702 | 4/1985 | WIPO . |
| WO 94/16155 | 7/1994 | WIPO . |

*Primary Examiner*—J. J. Swann
*Assistant Examiner*—F. Zeender
*Attorney, Agent, or Firm*—Woodcock Washburn Kurtz Mackiewicz & Norris LLP

[57] ABSTRACT

An improved axle control apparatus for industrial vehicles. A multi-movement hydraulic cylinder is provided at each end of a rear axle to couple the rear axle with a body frame. Each cylinder has a pair of oil chambers, which are defined by a piston. The oil chambers of the same cylinder are connected with each other by an oil line. An electromagnetic valve is located in each oil line. When the electromagnetic valves open the lines, oil flow between the chambers of the same cylinders is permitted. This permits the pistons to move. When the electromagnetic valve closes the lines, oil flow between the chambers of the same cylinders is prohibited. This locks the pistons. When the pistons in both cylinders are movable, the rear axle is permitted to tilt relative to the body frame. The rear axle is locked by locking the piston of at least one of the cylinders. Thus, if one of the cylinders is malfunctioning, the rear axle is locked by the other cylinder. The reliability of the apparatus is improved accordingly.

13 Claims, 3 Drawing Sheets

AXLE TILT CONTROL APPARATUS FOR INDUSTRIAL VEHICLES

BACKGROUND OF THE INVENTION

The present invention relates to an apparatus that controls tilting of an axle in an industrial vehicle such as a forklift. More particularly, the present invention pertains to an axle tilt control apparatus for locking an axle, which is tiltably supported by a vehicle's body frame, against tilting.

A typical industrial vehicle such as a forklift includes a rear axle that tilts relative to the body frame. The rear axle tilts such that all the wheels always contact the ground even if the vehicle runs over bumps and dips on the road surface. This structure improves comfort and stability of the vehicle.

However, when a carried object is heavy and is elevated to a relatively high position or when the vehicle turns at a high speed, tilting of the axle may destabilize the vehicle. Thus, an apparatus for locking the rear axle to the frame has been proposed.

Japanese Unexamined Patent Publication No. 58-167214 discloses an industrial vehicle having such an apparatus. The middle of the vehicle's rear axle is coupled to the body frame to be tiltable relative to the body frame. The ends of the rear axle are coupled to the body frame by a pair of single-movement hydraulic cylinders, respectively. The hydraulic cylinders each have a piston rod and an oil chamber that is connected to a common electromagnetic control valve by a line. Each piston rod is extended by supplying oil to the corresponding oil chamber. The control valve is moved between a open position to connect the oil chambers with each other and a closed position to disconnect the oil chambers from each other. Connecting the oil chambers with each other permits oil in the chambers to flow back and forth. As the piston rod of one of the hydraulic cylinders is extended, the piston rod of the other cylinder is retracted. Accordingly, the axle is tilted relative to the body frame. When the oil chambers are disconnected from each other, oil in the chambers cannot flow between the chambers. Thus, the piston rods are fixed. As a result, the axle is locked to the frame.

The hydraulic cylinders of the Japanese publication are single-movement type. In such a hydraulic cylinder, the pressure of the oil in the oil chamber prevents the piston rod from retracting when oil flow from the oil chamber is restricted. In this state, however, the oil pressure does not prevent the piston rod from extending. Application of single-movement hydraulic cylinders to an axle locking apparatus therefore raises the following problems. If one of the hydraulic cylinders malfunctions, for example, if a piston seal ring is damaged, the hydraulic cylinder allows its piston rod to extend and retract even if the electromagnetic control valve is at the closed position. On the other hand, the other hydraulic cylinder, which is functioning normally, does not restrict the extension of its piston rod. The axle is therefore not locked relative to the body frame.

SUMMARY OF THE INVENTION

Accordingly, it is an objective of the present invention to provide an axle tilt control apparatus for industrial vehicles that has two hydraulic cylinders and that positively locks the axle even if one of the cylinders malfunctions.

To achieve the foregoing and other objectives and in accordance with the purpose of the present invention, an improved apparatus for controlling tilting of an axle is provided. The middle of the axle is pivotally supported by the frame of an industrial vehicle such that the axle is tiltable relative to the frame. The apparatus includes a pair of hydraulic cylinders located near the ends of the axle. Each cylinder is connected to both the axle and the frame. Each cylinder includes a piston and a pair of fluid chambers defined by the piston. Each piston is movable when fluid is permitted to enter and exit its fluid chambers. Each piston is locked against movement when fluid is not permitted to enter and exit its fluid chambers. The axle is tiltable when the pistons in the cylinders are movable. The axle cannot tilt when the piston of at least one of the cylinders is locked. The apparatus further includes a valve device that selectively permits and prohibits flow of fluid into and from the fluid chambers of the cylinders.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
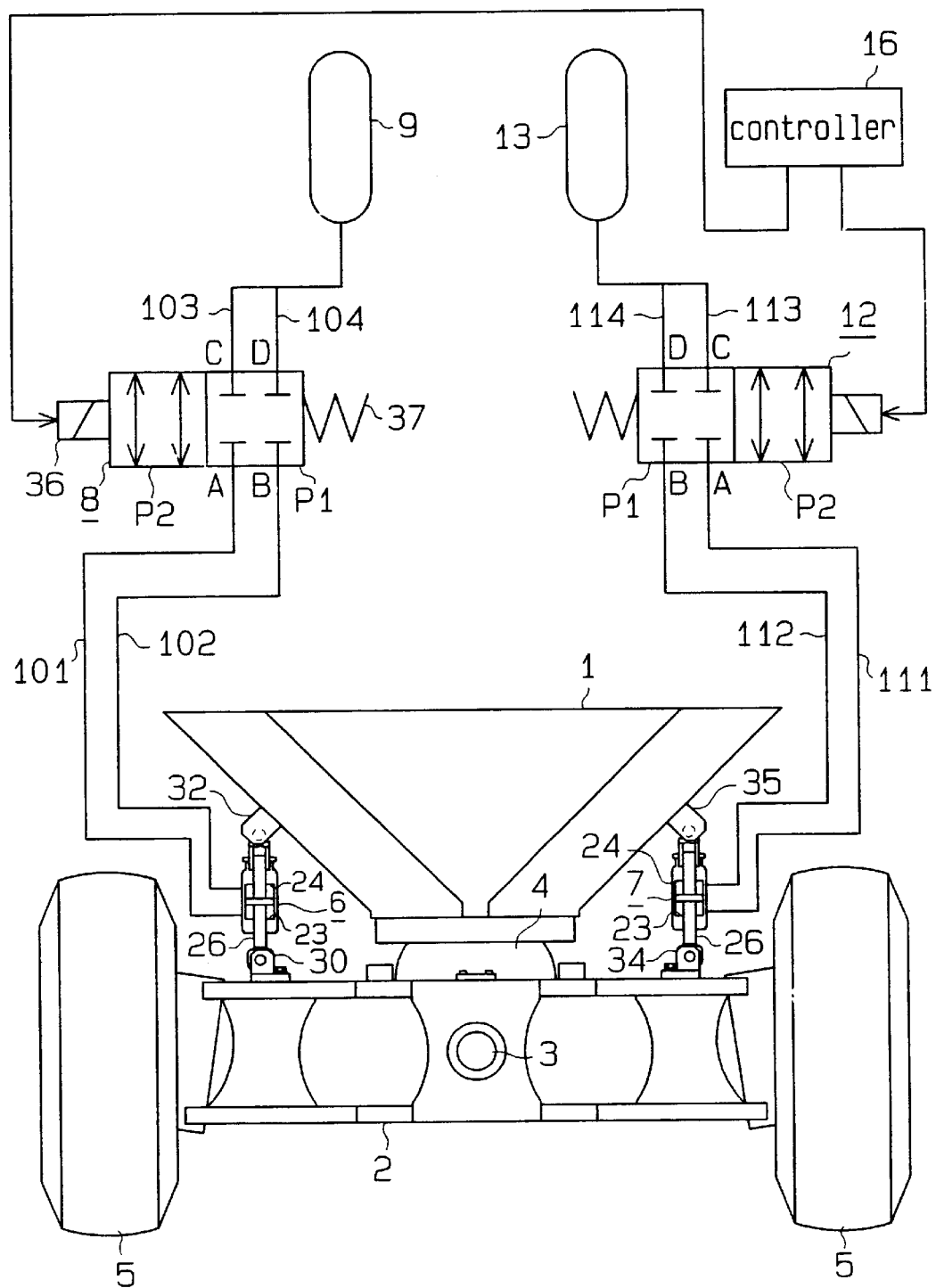
FIG. 1 is a diagrammatic view showing a first embodiment of a rear axle controller according to the present invention.

A forklift having an apparatus according to a first embodiment of the present invention will now be described with reference to FIGS. 1 and 2. As shown in FIG. 1, a rear axle 2 extends beneath the lower rear portion of a body frame 1. The rear axle 2 is connected to the body frame 1 by a center pin 3 to pivot about the pin 3. A rubber shock absorber 4 is arranged between the body frame 1 and the rear axle 2. The shock absorber 4 absorbs shocks accompanying tilting of the rear axle 2 thereby preventing the shocks from being transferred to the body frame 1. Rear wheels 5, which are steered to turn the vehicle, are coupled to the ends of the rear axle 2.

In this description, the words "left" and "right" refer to the left and right sides of FIG. 1. The left end of the rear axle 2 is coupled to the body frame 1 by a multi-movement hydraulic cylinder 6. The right end of the rear axle 2 is coupled to the body frame 1 by another multi-movement hydraulic cylinder 7. The cylinders 6, 7 have the same construction.

Electromagnetic control valves 8, 12 and accumulators 9, 13 are provided in the body frame 1. The control valve 8 is connected to the left hydraulic cylinder 6 by lines 101 and 102 and to the accumulator 9 by lines 103, 104. The lines 103 and 104 are merged with each other before reaching the accumulator 9. The control valve 12 is connected to the right hydraulic cylinder 7 by lines 111 and 112 and to the accumulator 13 by lines 113, 114. The lines 113 and 114 are merged with each other before reaching the accumulator 13. An axle tilt controller 16 is also provided in the body frame 1. The controller controls the valves 8, 12.

Since the hydraulic cylinders 6, 7 are identical, only the left cylinder 6 will be described. As shown in FIG. 2, the cylinder 6 includes a housing 20 and lids 21, 22 to close the openings of the housing 20. A piston 25 is slidably accommodated in the housing 20. The piston 25 divides the interior of the housing 20 into a first oil chamber 23 and a second oil chamber 24. A seal ring 25a is fitted about the circumference of the piston 25 to seal between the piston 25 and the housing 20. The first oil chamber 23 is connected to the line 101. The second oil chamber 24 is connected to the line 102.

A piston rod 26 extends from one end face of the piston 25, and a guide rod 27 extends coaxially from the opposite face. The piston rod 26 and the guide rod 27 have the same cross-sectional area. The piston rod 26 extends from the piston 25 through the first oil chamber 23 and the lid 21. The distal end of the rod 26 protrudes from the housing 20. The proximal end portion of the piston rod 26 has a smaller diameter than that of the rest of the rod 26. The small diameter portion extends through the piston 25 and protrudes into the second oil chamber 24. A bolt portion 26a is formed at the small diameter portion.

The guide rod 27 has a threaded hole 27a at its proximal end. The bolt portion 26a of the piston rod 26 is threaded into the threaded hole 27a. This fastens the piston rod 26 to the guide rod 27 with the piston 25 in between. Since the rods 26 and 27 have the same cross-sectional areas, the pressure receiving area of the piston 25 in the first oil chamber 23 is equal to the pressure receiving area of the piston 25 in the second oil chamber 24. The guide rod 27 extends through the second oil chamber 24 and the lid 22 and is slidably supported by a hole 22a formed in the lid 22. A cylindrical guide member 28 is fixed to the lid 22. The distal end of the guide rod 27 is accommodated in a hole 28a formed in the guide member 28.

A lower support 30 is fixed to the upper left surface of the rear axle 2. An upper support member 32 is fixed to the left side of the body frame 1. The distal end of the piston rod 26 is pivotally coupled to the support 30 by a pin 31. The distal end of the guide member 28 is pivotally coupled to the support member 32 by a pin 33.

As shown in FIG. 1, a lower support 34 is fixed to the upper right surface of the rear axle 2. An upper support 35 is fixed to the right side of the body frame 1. The right hydraulic cylinder 7 is coupled to the supports 34, 35 in the same manner as the left cylinder 6. The first oil chamber 23 of the cylinder 7 is connected to the line 111. The second oil chamber 24 of the cylinder 7 is connected to the line 112.

As shown in FIG. 1, the control valves 8, 12 are two-way switching valves that have four ports A, B, C and D. In the left control valve 8, the port A is connected to the line 101, the port B is connected to the line 102, the port C is connected to the line 103 and the port D is connected to the line 104. In the right control valve 12, the port A is connected to the line 111, the port B is connected to the line 112, the port C is connected to the line 113, the port D is connected to the line 114. The control valves 8, 12 are moved between a closed position P1 and a open position P2. At the closed position P1, each of the control valves 8, 12 disconnects the ports A, B, C and D. At the open position P2, each of the control valves 8, 12 connects the port A with the port C and the port B with the port D.

Each of the control valves 8, 12 has an electromagnetic solenoid 36 and a spring 37. When current is not supplied to the solenoids 36, that is, when the solenoids 36 are de-excited, the control valves 8, 12 are moved to the closed positions P1 by the force of the spring 37. When excited by current, the solenoids 36 move the control valves 8, 12 to the open position P2 against the force of the springs 37. The control valves 8, 12 are normally closed valves, that is, they are at the closed positions P1 when the solenoids 36 are de-excited.

When at the closed position, the left control valve 8 shuts the lines 101, 102, which are connected to the hydraulic cylinder 6. Likewise, when at the closed position, the right control valve 12 shuts the lines 111, 112, which are connected to the hydraulic cylinder 7. In this state, oil flow from and into the oil chambers 23, 24 is prohibited. Accordingly, the piston rod 26 is locked. As a result, the rear axle 2 is locked to the frame 1 and cannot tilt.

When at the open position, the left control valve 8 connects the first oil chamber 23 of the cylinder 6 with the accumulator 9 through the line 101, the ports A, C and the line 103. The control valve 8 also connects the second oil chamber 24 with the accumulator 9 by the line 102, the ports B, D and the line 104. When at the open position, the right control valve 12 connects the first oil chamber 23 of the cylinder 7 with the accumulator 13 by the line 111, the ports A, C and the line 113. The control valve 12 also connects the second oil chamber 24 with the accumulator 13 by the line 112, the ports B, D and the line 114. In this state, the oil chambers 23, 24 of the same cylinder 6, 7 are connected with each other and oil flow between the chambers 23, 24 of the same cylinder is permitted. This permits the piston rod 26 to move. In other words, the axle 2 is tiltable.

When the engine (not shown) is running, the controller 16 normally feeds current to the solenoids 36 in the control valves 8, 12 thereby allowing the rear axle 2 to tilt relative to the body frame 1. However, when predetermined locking conditions are satisfied, the controller 16 stops feeding current to the control valves 8, 12 to lock the rear axle 2. The lock conditions include at least one of the following conditions: the height of the fork (not shown) being equal to or greater than a predetermined height, the wheel angle of the rear wheels 5 being equal to or greater than a predetermined angle, the vehicle speed being equal to or greater than a predetermined speed.

The operation of the axle tilt control apparatus will now be described.

When the engine is started, the controller 16 feeds current to the control valves 8, 12. This moves the control valves 8, 12 from the closed position P1 to the open position P2. In each of the cylinders 6, 7, oil flow is permitted between the oil chambers 23 and 24. The rear axle 2 is therefore tiltable relative to the body frame 1.

Specifically, when the rear axle 2 is tilted clockwise (as viewed in FIG. 1) relative to the body frame 1, the piston rod 26 of the left cylinder 6 retracts while the piston rod 26 of the right cylinder 7 extends. When the rear axle 2 is tilted counterclockwise relative to the body frame 1, the piston rod 26 of the left cylinder 6 extends and the piston rod 26 of the right cylinder 7 retracts. When the piston rod 26 retracts, oil is drained from the second oil chamber 24 and is drawn into the first oil chamber 23. When piston rod 26 extends, oil is drained from the first oil chamber 23 and is drawn into the second oil chamber 24.

In each of the cylinders 6, 7, the pressure receiving area of the piston 25 in the first oil chamber 23 is equal to the pressure receiving area of the piston 25 in the second oil chamber 24. Therefore, the amount of oil drained from one of the chambers 23, 24 is equal to the amount of oil drawn into the other chamber. This guarantees smooth motion of the pistons 25 in the cylinders 6, 7 thereby ensuring smooth tilting of the rear axle 2.

When judging that the locking conditions are not satisfied, the controller 16 stops feeding current to the control valves 8, 12. This moves the control valves 8, 12 from the open position P2 to the closed position P1. The control valves 8, 12 prohibit oil flow from and into the oil chambers 23, 24 in the hydraulic cylinders 6, 7. As a result, the rear axle 2 is locked.

If the seal ring 25a of the piston 25 in the left cylinder 6 is damaged, there may be a space between the circumference of the piston 25 and the inner wall of the housing 20. In this case, even if the corresponding control valve 8 is at the closed position P1, the space allows oil to flow between the chambers 23 and 24. As a result, the piston rod 26 of the left cylinder 6 is movable.

However, with both control valves 8, 12 at the closed position P1, oil flow between the oil chambers 23 and 24 of the right oil cylinder 7, assuming the right cylinder 7 is functioning normally, is prohibited. Thus, the right cylinder 7 is locked. In other words, the rear axle is locked only by the right hydraulic cylinder 7. If the right cylinder 7 is damaged, on the other hand, the left hydraulic cylinder 6, assuming the left cylinder 6 is functioning normally, locks the rear axle 2. The reliability of the apparatus is improved accordingly. The apparatus thus allows the forklift to travel and perform loading and unloading with stability.

The controller 16 feeds or stops current to the control valves 8, 12 at the same time. Therefore, the hydraulic cylinders 6, 7 are locked or unlocked at the same time. This makes switching between locking and unlocking of the rear axle 2 smooth. Further, if one of the cylinders 6 and 7 malfunctions, the rear axle 2 is switched between the locked state and the unlocked state as in the case where both cylinders 6, 7 are functioning normally. That is, the controller 16 feeds or stops current to both control valves 8, 12. Then, the valve 8, 12 that is functioning normally locks or unlocks the rear axle 2. In other words, a single controlling process applies to a case where the cylinders 6, 7 are functioning and to a case where one of the cylinders 6, 7 is malfunctioning. This eliminates the necessity for detecting a malfunction in the cylinders 6, 7 thereby simplifying the construction of the apparatus.

When the controller 16 malfunctions, current is not fed to the control valves 8, 12. In other words, locking of the rear axle 2 is not controlled. In such a case, stability of the vehicle should take priority over comfort. Therefore, the control valves 8, 12 are normally closed type. Therefore, if the controller 16 cannot feed current to the control valves 8, 12 due to malfunction, oil flow between the oil chambers 23, 24 in the cylinders 6, 7 is prohibited. The rear axle 2 is locked, accordingly. Thus, a malfunction of the controller 16 does not result in instability.

It should be apparent to those skilled in the art that the present invention may be embodied in many other specific forms without departing from the spirit or scope of the invention. Particularly, it should be understood that the invention may be embodied in the following forms.

Figure 3:
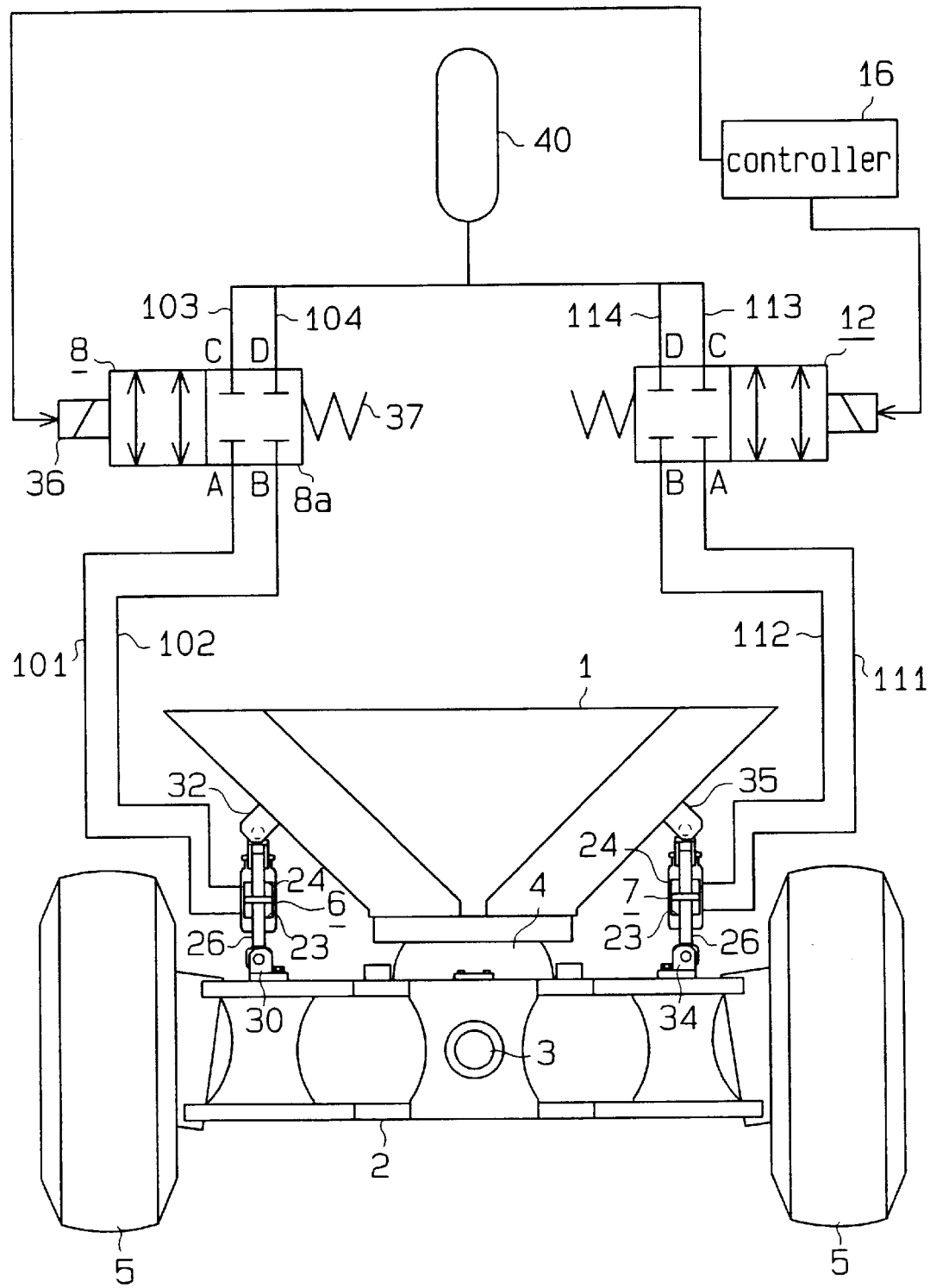
FIG. 3 is a diagrammatic view illustrating a second embodiment of a rear axle controller according to the present invention.

FIG. 3 illustrates an axle tilt control apparatus according to a second embodiment. The apparatus has a single accumulator 40 corresponding to both hydraulic cylinders 6, 7. Since accumulators are relatively large, reducing the number of the accumulators to one reduces the size of the apparatus.

A switching valve may be located between the electromagnetic control valves 8 and 12. The switching valve is switched among three positions. At one position, the switching valve connects the accumulator 40 with both control valves 8, 12. At another position, the switching valve connects the accumulator 40 with one of the control valves 8, 12. At the other position, the switching valve connects the accumulator 40 with the other one of the control valves 8, 12. If one of the cylinders 6, 7 malfunctions, the switching valve disconnects one of the control valves 8, 12 that corresponds to the malfunctioning cylinder. Therefore, oil from the accumulator 40 is not supplied to the malfunctioning cylinder.

The control valves 8, 12 may be normally open type valves that are at the open position P2 when the solenoids 36 are de-excited. Therefore, contrary to the embodiments of FIGS. 1–3, the rear axle 2 is tiltable relative to the body frame 1 when the controller 16 malfunctions and cannot supply current to the control valves 8, 12. Therefore, if the controller 16 malfunctions while the vehicle is traveling on uneven ground with number of bumps and dips, the rear axle 2 tilts relative to the body frame 1 such that all the four wheels constantly contact the ground.

Figure 2:
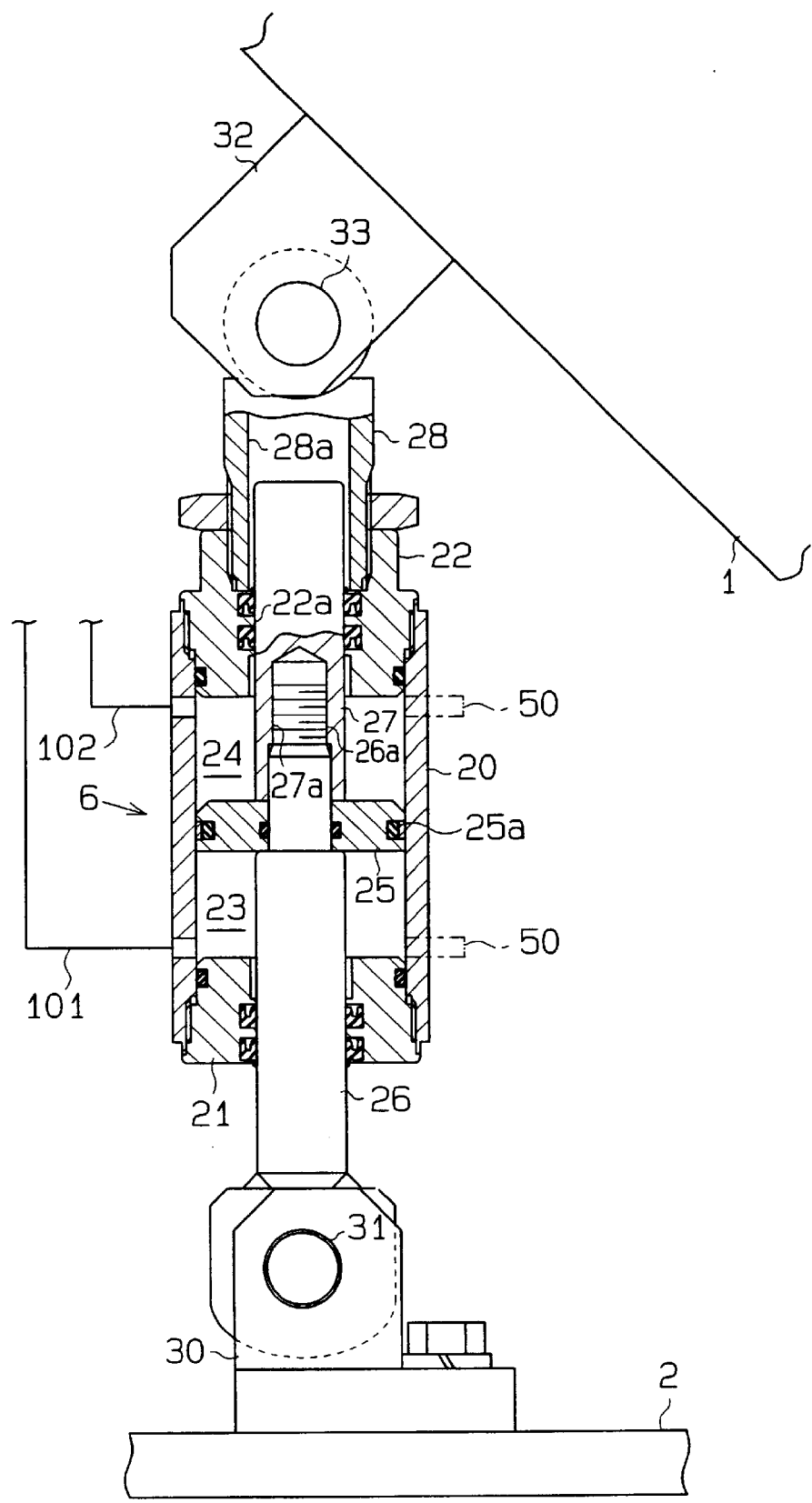
FIG. 2 is an enlarged cross-sectional view illustrating a hydraulic cylinder used in the axle controller of FIG. 1.

Contrary to the embodiment of FIGS. 1 and 2, the piston rods 26 of the hydraulic cylinders 6, 7 may be coupled to the body frame 1 and the guide members 28 may be coupled to the rear axle 2.

The hydraulic cylinders 6, 7 may be controlled by a single electromagnetic valve. This reduces the size of the apparatus.

The control valves 8, 12, which are controlled by the controller 16, may be replaced with one or two manual switching valves, which are manually controlled by an operator of the forklift. That is, a manual switching valve may be connected to each of the cylinders 6, 7. Alternatively, a single manual switching valve may be connected to both cylinders 6, 7. The operator manipulates the switching valve(s) to lock the cylinders 6, 7 when she/he judges that the rear axle 2 must be locked, for example, when the position of the fork is relatively high.

If a single manual valve is provided, the cylinders 6, 7 are locked or unlocked simultaneously by manipulating the single valve. If there are two manual valves that are manipulated simultaneously, the cylinders 6, 7 are also locked or unlocked simultaneously. If the two valves are independently manipulated, the cylinders 6, 7 are independently locked or unlocked.

If the hydraulic cylinders 6, 7 are locked and unlocked simultaneously, the apparatus having the manual switching valve(s) has the same advantages as the apparatus illustrated in FIGS. 1 and 2. If the hydraulic cylinders 6, 7 are independently locked and unlocked, tilting of the rear axle 2 may be controlled by using only one of the hydraulic cylinders 6, 7. If one hydraulic cylinder malfunctions, tilting of the rear axle 2 is controlled by the other cylinder.

The state of the hydraulic cylinders 6, 7 may be detected and the control valves 8, 12 may be independently controlled based on the detection results. Specifically, as illustrated by two-dotted lines in FIG. 2, two pressure sensors 50 may be attached to the cylinder 6 to detect oil pressure in the oil chambers 23, 24. Identical pressure sensors 50 are attached to the cylinder 7. The controller 16 judges whether the cylinders 6, 7 are normally functioning based on oil pressure detected by the pressure sensors 50. For example, if the oil pressure detected by the pressure sensors 50 is equal to or lower than a predetermined level, the controller 6 judges that the cylinders 6, 7 are malfunctioning. The predetermined value of the oil pressure is determined based on the oil pressure in the oil chambers 23, 24 when the normally functioning cylinders 6, 7 are locked.

In this embodiment, the controller 16 controls only one of the control valves 8, 12 at a time. In other words, the controller 16 controls tilting of the rear axle 2 by using one of the hydraulic cylinders 6, 7. If the controller 16 judges that one of the hydraulic cylinders 6, 7 has malfunctioned based on the detection results of the pressure sensors 50, the controller 16 starts controlling the other control valve. That is, the controller 16 controls tilting of the rear axle 2 by the other hydraulic cylinder.

In each of the preferred and illustrated embodiments, the present invention is applied to a forklift having forks on which loads are placed. However, the present invention may be applied to other types of lift trucks. For example, the present invention may be applied to a lift truck having clamps or a ram. Further, the present invention may be applied to other types of industrial vehicles such as shovel loaders, which hold a load at a high position when carrying the load. The present invention may also be applied to other types of industrial vehicles, such as construction vehicles.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling tilting of an axle, wherein the middle of the axle is pivotally supported by the frame of an industrial vehicle such that the axle is tiltable relative to the frame, the apparatus comprising:

a pair of hydraulic cylinders located near the ends of the axle, each cylinder being connected to both the axle and the frame, wherein each cylinder includes a piston and a pair of fluid chambers defined by the piston, wherein each piston is movable when fluid is permitted to enter and exit the corresponding fluid chambers, and wherein each piston is locked against movement when fluid is not permitted to enter and exit the corresponding fluid chambers, wherein the axle is tiltable when the pistons in the cylinders are movable, and wherein the axle cannot tilt when the piston of at least one of the cylinders is locked;

a pair of valves, each corresponding to one of the cylinders, wherein each valve selectively permits and prohibits flow of fluid into and from the fluid chambers of the corresponding cylinder;

a controller for controlling the valves, wherein the controller controls only one of the valves at a time such that the cylinder corresponding to a currently controlled valve is regulated to control tilting of the axle;

a sensor for detecting the fluid pressure in at least one of the fluid chambers of each cylinder; and means for determining whether the cylinder corresponding to the currently controlled valve is functioning normally based on the fluid pressure detected by a corresponding one of the sensors being above a predetermined level of pressure, wherein, when the determining means determines that the cylinder corresponding to the currently controlled valve is malfunctioning, the controller controls the other valve such that the other cylinder is regulated to independently control the tilting of the axle irrespective of the malfunctioning valve.

2. The apparatus according to claim 1, further comprising fluid passages connected to the fluid chambers of each cylinder, respectively, wherein each valve selectively opens and closes the fluid passages that correspond to one of the cylinders.

3. The apparatus according to claim 1, wherein the controller controls each valve based on the satisfaction of a predetermined condition, wherein satisfaction of the predetermined condition indicates that the axle needs to be locked.

4. The apparatus according to claim 3, wherein the controller controls each valve such that the corresponding cylinder is locked when the locking condition is satisfied, and wherein the controller controls each valve such that the corresponding cylinder is unlocked when the locking condition is not satisfied.

5. The apparatus according to claim 1, wherein each valve is electromagnetic and is actuated by electric current, and wherein each valve prohibits flow of fluid into and from the fluid chambers of the corresponding cylinder when current is not supplied to the valve.

6. The apparatus according to claim 1, wherein the piston of each cylinder has a pressure receiving surface facing one of the fluid chambers and another pressure receiving surface facing the other fluid chamber, and wherein the pressure receiving surfaces have the same area.

7. The apparatus according to claim 1, wherein the industrial vehicle is a forklift, and wherein the axle supports a pair of rear wheels.

8. An apparatus for controlling tilting of an axle, wherein the middle of the axle is pivotally supported by the frame of an industrial vehicle such that the axle is tiltable relative to the frame, the apparatus comprising:

a pair of hydraulic cylinders located near the ends of the axle, each cylinder being connected to both the axle and the frame, wherein each cylinder includes a piston and a pair of fluid chambers defined by the piston, wherein each piston is movable when fluid is permitted to enter and exit the corresponding fluid chambers, and wherein each piston is locked against movement when fluid is not permitted to enter and exit the corresponding fluid chambers, wherein the axle is tiltable when the pistons in the cylinders are movable, and wherein the axle cannot tilt when the piston of at least one of the cylinders is locked;

fluid passages connected to the fluid chambers of each cylinder, respectively;

a pair of electromagnetic valves, one electromagnetic valve being connected to the fluid passages that correspond to each cylinder, wherein each electromagnetic valve selectively opens and closes the corresponding fluid passages thereby selectively permitting and prohibiting flow of fluid into and from the fluid chambers of the corresponding cylinder, wherein each electromagnetic valve closes the corresponding fluid passages when electric current is not supplied to the electromagnetic valve;

a controller that controls the valves based on the satisfaction of a predetermined condition, wherein satisfaction of the predetermined condition indicates that the axle needs to be locked, and wherein the controller controls only one of the electromagnetic valves at a time such that the cylinder corresponding to a currently controlled valve is regulated to control tilting of the axle;

a sensor for detecting the fluid pressure in at least one of the fluid chambers of each cylinder; and means for determining whether the cylinder corresponding to the currently controlled valve is functioning normally based on the fluid pressure detected by a corresponding one of the sensors being above a predetermined level of pressure, wherein, when the determining means determines that the cylinder corresponding to the currently controlled valve is malfunctioning, the controller controls the other electromagnetic valve such that the other cylinder is regulated to independently control the tilting of the axle errespective of the malfunctioning valve.

9. The apparatus according to claim 8, wherein the piston of each cylinder has a pressure receiving surface facing one of the fluid chambers and another pressure receiving surface facing the other fluid chamber, and wherein the pressure receiving surfaces have the same area.

10. An apparatus for controlling tilting of an axle of an industrial vehicle, wherein the vehicle has a frame, the apparatus comprising:

a pivot joint for connecting the axle to the frame, wherein the pivot joint is located at the midpoint of the axle;

a first hydraulic cylinder for connecting a first end of the axle to the frame;

a second hydraulic cylinder for connecting a second end of the axle to the frame;

a piston, an upper fluid chamber, and a lower fluid chamber included in each cylinder, wherein the upper chamber is separated from the lower chamber of each cylinder by the corresponding piston;

a plurality of fluid passages, one being connected to and communicating with each fluid chamber of each cylinder;

a pair of valves, one valve being connected to the fluid passages that correspond to each cylinder, wherein each valve regulates the corresponding fluid passages for selectively opening and closing the corresponding fluid passages such that hydraulic fluid is selectively permitted to enter and prevented from exiting the fluid chambers of the corresponding cylinder, wherein the passages associated with a selected one of the cylinders are closed to prevent fluid from exiting or entering the fluid chambers of the selected one cylinder to prevent the axle from tilting with respect to the framer;

a controller for controlling the valves, wherein the controller controls only one of the valves at a time such that the cylinder corresponding to the currently controlled valve is regulated to control tilting of the axle;

a sensor for detecting the fluid pressure in at least one of the fluid chambers of each cylinder; and means for determining whether the cylinder corresponding to the currently controlled valve is functioning normally based on the fluid pressure detected by a corresponding one of the sensors being above a predetermined level of pressure, wherein, when the determining means determines that the cylinder corresponding to the currently controlled valve is malfunctioning, the controller controls the other valve such that the other cylinder is regulated to independently control the tilting of the axle irrespective of the malfunctioning valve.

11. The apparatus according to claim 10, wherein the valves are normally closed type valves.

12. The apparatus of claim 10, wherein the valves are electromagnetically actuated, and wherein the controller electrically controls the selected one of the electromagnetic valves such that the passages of the corresponding cylinder are closed under predetermined conditions.

13. The apparatus of claim 10, wherein the upper and lower fluid chambers associated with a given one of the cylinders are connected together when the passages connected to the given cylinder are not closed.

\* \* \* \* \*